United States Patent
Park et al.

(10) Patent No.: US 12,014,220 B2
(45) Date of Patent: Jun. 18, 2024

(54) LEARNING-BASED AUTOMATIC SELECTION OF AI APPLICATIONS

(71) Applicant: INTERNATIONAL BUSINESS MACHINES CORPORATION, Armonk, NY (US)

(72) Inventors: Sun Young Park, San Diego, CA (US); Kourosh Jafari-Khouzani, Rego Park, NY (US); Dustin Michael Sargent, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/931,147

(22) Filed: Sep. 12, 2022

(65) Prior Publication Data

US 2024/0086248 A1 Mar. 14, 2024

(51) Int. Cl.
*G06F 9/50* (2006.01)
*G06F 11/34* (2006.01)

(52) U.S. Cl.
CPC ........ *G06F 9/5055* (2013.01); *G06F 11/3495* (2013.01)

(58) Field of Classification Search
CPC .......... G06F 9/50; G06F 9/5055; G06F 11/34; G06F 11/3495; A61B 5/0066; A61B 5/0075; G06K 9/0014; G06K 9/4628; G06N 3/0445; G06N 3/086; G06N 3/0454
USPC ........................................................ 709/203
See application file for complete search history.

(56) References Cited

U.S. PATENT DOCUMENTS

| | | | | |
|---|---|---|---|---|
| 10,878,219 | B2 * | 12/2020 | Zhou | G06F 18/285 |
| 11,094,060 | B1 * | 8/2021 | Min | A61B 6/481 |
| 11,694,786 | B1 * | 7/2023 | Van Wilt | G16H 10/60 600/27 |
| 2020/0211692 | A1 * | 7/2020 | Kalafut | G06N 20/00 |
| 2020/0334809 | A1 * | 10/2020 | Vianu | G06V 30/1916 |
| 2021/0134442 | A1 * | 5/2021 | Ahn | G16H 30/40 |
| 2021/0334693 | A1 * | 10/2021 | Bavly | G06F 16/24578 |

(Continued)

FOREIGN PATENT DOCUMENTS

| WO | WO-2022226439 A1 * | 10/2022 | ........... A61B 5/0022 |
|---|---|---|---|
| WO | WO-2023219836 A1 * | 11/2023 | ............. G16H 30/20 |

OTHER PUBLICATIONS

Chan, et al., "Artificial Intelligence in Medical Applications", Journal of Healthcare Engineering, 2018, 2 pgs., <https://www.hindawi.com/journals/jhe/2018/4827875/>.

(Continued)

*Primary Examiner* — James N Fiorillo
(74) *Attorney, Agent, or Firm* — Teddi E. Maranzano

(57) ABSTRACT

An embodiment for learning-based automatic selection of artificial intelligence applications. The embodiment may receive a user request for an exam, the user request including exam information. The embodiment may automatically identify an exam type cluster corresponding to the received exam information. The embodiment may automatically detect applicable AI applications corresponding to the identified exam type cluster. The embodiment may automatically run each applicable AI application on a series of relevant test sets to generate a score for each applicable AI application. The embodiment may automatically recommend to a user a highest-scoring applicable AI application.

20 Claims, 4 Drawing Sheets

(56) References Cited

U.S. PATENT DOCUMENTS

| | | | | |
|---|---|---|---|---|
| 2021/0365793 | A1* | 11/2021 | Surya | G06N 3/045 |
| 2021/0375455 | A1* | 12/2021 | Matthews | A61K 31/18 |
| 2021/0409976 | A1* | 12/2021 | Ergen | H04W 72/541 |
| 2022/0206865 | A1* | 6/2022 | Voruganti | G06N 20/00 |
| 2022/0277445 | A1* | 9/2022 | Choi | G06T 7/20 |
| 2022/0301159 | A1* | 9/2022 | Byun | A61B 1/0005 |
| 2023/0154592 | A1* | 5/2023 | Sargent | G16H 15/00 705/2 |
| 2023/0154612 | A1* | 5/2023 | Sargent | G16H 30/40 705/3 |
| 2023/0206435 | A1* | 6/2023 | Byun | G16H 40/67 382/128 |
| 2023/0207130 | A1* | 6/2023 | Matthews | G16H 50/30 706/11 |
| 2023/0245651 | A1* | 8/2023 | Wang | G06N 5/022 704/275 |
| 2023/0404541 | A1* | 12/2023 | Fiegoli | A61B 8/5269 |

OTHER PUBLICATIONS

Disclosed Anonymously, "Artificial Intelligence in Healthcare", IP.com, IPCOM000250348D, Jul. 4, 2017, 7 pgs., <https://ip.com/IPCOM/00025034>.

Disclosed Anonymously, "Method to Communicate Embedded Data Creator Graphic to Facilitate Understanding of Clinical Relevance in Independent Systems", Jun. 16, 2020, 6 pgs., <https://ip.com/PCOM/000262632>.

Fiddler, "Build Trust Into AI with Analytics", Fiddler.ai, [Accessed on Internet Sep. 8, 2022], 7 pgs., Retrieved from Internet: <https://www.fiddler.ai/?utm_term=fiddler%20ai&utm_content=15445923813&utm_source=adwords&utm_medium=online_advertising&utm_campaign=&gclid=Cj0KCQjwpeaYBhDXARIsAEzltbGqY8uxQOf9uyi2qt8GAdcYN3GYAlhvimeC8JSyVmjzoAtBTZZou2QaAjVVEALw_wcB>.

Ge, "AI Transformation Simplified", GE HealthCare, Edison AI Orchestrator, [Accessed on Internet Sep. 7, 2022], 8 pgs., Retrieved from Internet: <https://www.gehealthcare.com/-/jssmedia/global/products/files/healthcare-digital/edison-open-ai-orchestrator/edison-open-ai-orchestrator-brochure.pdf?rev=-1>.

Google, "Vertex AI", Google.com, [Accessed on Internet Sep. 7, 2022], 17 pgs., Retrieved from Internet: <https://cloud.google.com/vertex-ai>.

Jiang, et al., "Development and application of artificial intelligence in cardiac imaging", Br J Radiol 2020, 93:20190812, British Institute of Radiology, Jan. 28, 2020, 12 pgs., <https://www.birpublications.org/doi/10.1259/bjr.20190812>.

Manne, et al., "Application of Artificial Intelligence in Healthcare: Chances and Challenges", Current Journal of Applied Science and Technology, 40(6): 78-89, 2021; Article No. CJAST.67947, Apr. 24, 2021, 12 pgs.

Reddy, et al., "Evaluation framework to guide implementation of AI systems into healthcare settings", BMJ Journals, [Accessed on Internet Sep. 7, 2022], 18 pgs., Retrieved from Internet: <https://informatics.bmj.com/content/28/1/e100444>.

Somaraju, "Protection Against Adversarial Attacks On Machine Learning and Artificial Intelligence", IP.com, IPCOM000252595D, Jan. 29, 2018, 8 pgs., <https://ip.com/IPCOM/0002525>.

Tang, "The role of artificial intelligence in medical imaging research", BJR Open 2020; 2:20190031, British Institute of Radiology, Nov. 13, 2019, 5 pgs., <https://www.birpublications.org/doi/10.1259/bjro.20190031>.

* cited by examiner

LEARNING-BASED AUTOMATIC SELECTION OF AI APPLICATIONS

BACKGROUND

The present application relates generally to artificial intelligence (AI) imaging orchestrator systems, and more particularly, to a method of learning-based automatic selection of AI applications.

AI orchestrator systems are typically cloud-based services that provide digital image processing systems with scalable access to multiple AI applications. Selection of a specific AI application for use by a digital image processing system is often dependent upon the exam or digital imaging process being performed. For any given exam type or digital imaging process, an AI orchestrator system may include multiple applicable AI applications sourced from a variety of different vendors. Selecting an appropriate AI application for a given exam or digital imaging process is a priority for many healthcare providers.

SUMMARY

According to one embodiment, a method, computer system, and computer program product for learning-based automatic selection of AI applications is provided. The embodiment may include receiving a user request for an exam, the user request including exam information. The embodiment may also include automatically identifying an exam type cluster corresponding to the received exam information. The embodiment may further include automatically detecting applicable AI applications corresponding to the identified exam type cluster. The embodiment may also include automatically running each applicable AI application on a series of relevant test sets to generate a score for each applicable AI application. The embodiment may further include automatically recommending to the user a highest-scoring applicable AI application.

BRIEF DESCRIPTION OF THE SEVERAL VIEWS OF THE DRAWINGS

These and other objects, features and advantages of the present disclosure will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
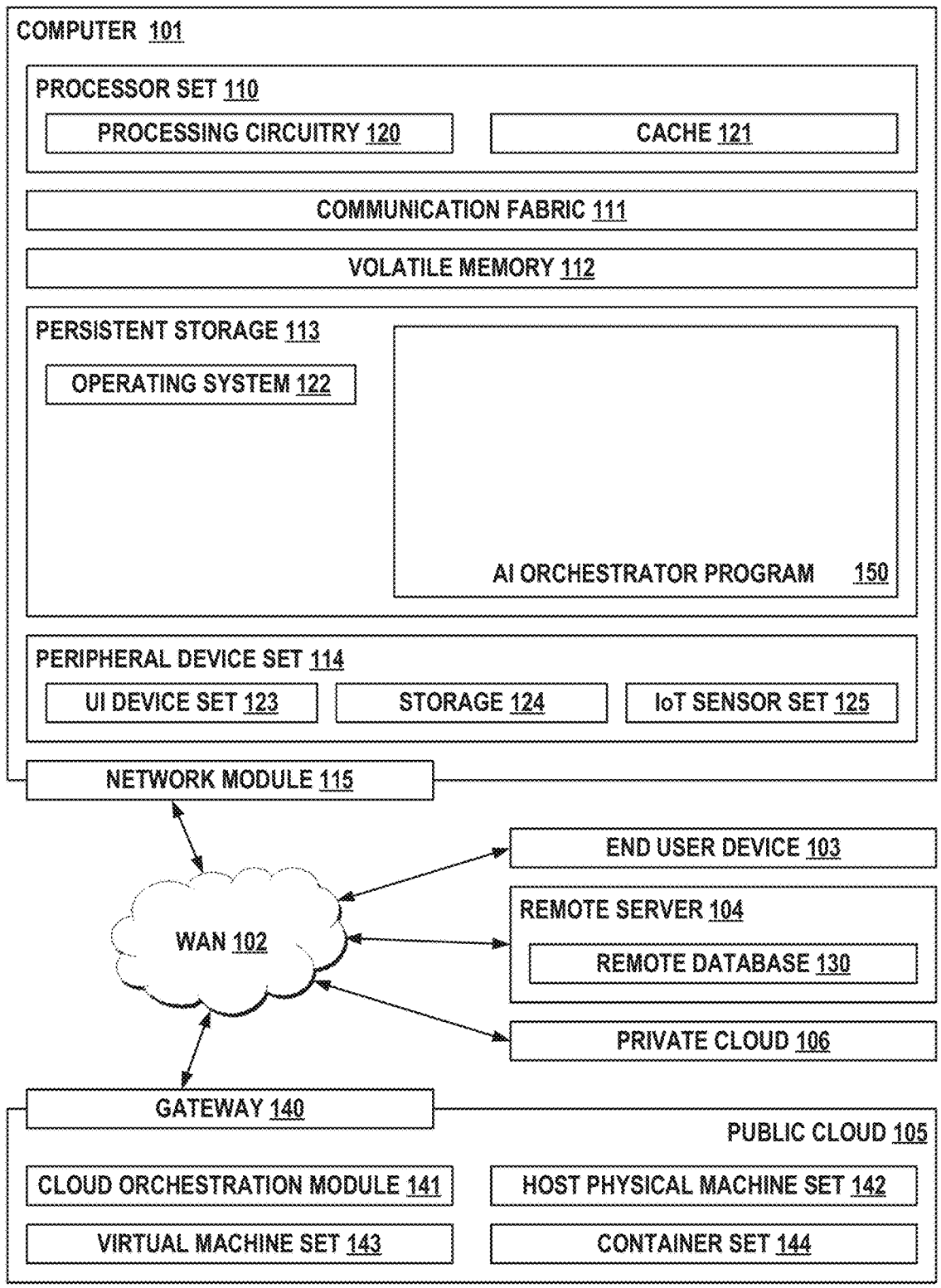
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. The present disclosure may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present application relate generally to artificial intelligence (AI) imaging orchestrator systems, and more particularly, to a method of learning-based automatic selection of AI applications. The following described exemplary embodiments provide a system, method, and program product to, among other things, automatically receive a user request for an exam, the user request including exam information, automatically identify an exam type cluster corresponding to the received exam information, automatically detect applicable AI applications corresponding to the identified exam type cluster automatically run each applicable AI application on a series of relevant test sets to generate a score for each applicable AI application, and automatically recommend to a user a highest-scoring applicable AI application. Therefore, the presently described embodiments have the capacity to improve automatic selection of AI applications by enabling orchestrator systems to identify a highest-scoring AI application for a specific exam type, thereby allowing the system to output a recommendation to a user that includes a highly relevant and high-performing AI application for a given request for an exam. Presently described embodiments further improve automatic selection of AI applications by providing learning-based selection processes that leverage feedback and test set data to improve the automatic selection process.

As previously described, AI orchestrator systems are typically cloud-based services that provide digital image processing systems with scalable access to multiple AI applications. Selection of a specific AI application for use by a digital image processing system is often dependent upon the exam or digital imaging process being performed. For any given exam type or digital imaging process, an AI orchestrator system may include multiple applicable AI applications sourced from a variety of different vendors. Selecting an appropriate AI application for a given exam or digital imaging process is a priority for many healthcare providers. Typically, AI orchestrator systems are configured to engage with a Picture Archiving and Communication System (PACS). A PACS includes medical imaging technology for storage of, and convenient access to, images from multiple source machine types. Electronic images and reports may be transmitted digitally via PACS; this eliminates the need to manually file, retrieve, or transport film jackets. The universal format for PACS image storage and transfer is DICOM (Digital Imaging and Communications in Medicine). Non-image data, such as scanned documents, may be incorporated using consumer industry standard formats like PDF (Portable Document Format), once encapsulated in DICOM. A PACS may include a variety of components, including but not limited to imaging modalities (such as X-ray computed tomography (CT), magnetic resonance imaging (MRI), ultrasound (US), positron emission tomography (PET), endoscopy (ES), mammograms (MG), Digital radiography (DR), computed radiography (CR), etc.), a secured network for the transmission of patient information, workstations and mobile devices for interpreting and reviewing images, and archives for the storage and retrieval of images and reports. In the context of this disclosure, PACS may refer to any image storage and retrieval system.

There are several challenges related to the use of AI orchestrator systems to select AI applications for exams. For example, many individual AI applications or algorithms are trained with limited or biased data and have narrow generalization capabilities. This makes it difficult to determine which AI algorithms perform best for a given exam type. Furthermore, newly added, or updated AI applications may have unknown performance statistics on various target patients, making it difficult to rely upon them or convince potential patient to commit to lower-performing or unproven AI applications. Additionally, AI orchestrator systems rarely include real-time advising tools for each AI application model. Many AI application or algorithm vendors thus invest in costly independent analysis.

Accordingly, a method, computer system, and computer program product for improved learning-based automatic selection of AI applications would benefit many businesses who utilize AI orchestrator systems and PACS, medical practitioners who use AI applications in their course of work, and patients who would benefit from improved AI application selection. The method, system, and computer program product may automatically receive a user request for an exam, the user request including exam information. The method, system, computer program product may automatically identify an exam type cluster corresponding to the received exam information. According to one embodiment, the method, system, computer program product may then automatically detect applicable AI applications corresponding to the identified exam type cluster. The method, system, computer program product may then automatically run each applicable AI application on a series of relevant test sets to generate a score for each applicable AI application. Then, the method, system, computer program product may automatically recommend to a user a highest-scoring applicable AI application. In turn, the method, system, computer program product has provided improved methods for learning-based automatic selection of AI applications. Described embodiments include improved methods for automatic AI selection based upon exam information and type to recommend a highly relevant and high performing AI application to a user for a given exam based upon a generated score reflecting an AI application's performance on a series of relevant test sets.

The present invention may be a system, a method, and/or a computer program product at any possible technical detail level of integration. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as AI orchestrator program/code 150. In addition to AI orchestrator code 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and AI orchestrator code 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in AI orchestrator code 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in AI orchestrator code 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the AI orchestrator program 150 may be a program capable of receiving a user request for an exam, the user request including exam information. AI orchestrator program 150 may then automatically identify an exam type cluster corresponding to the received exam information. Next, AI orchestrator program 150 may automatically detect applicable AI applications corresponding to the identified exam type cluster. AI orchestrator program 150 may then automatically run each applicable AI application on a series of relevant test sets to generate a score for each applicable AI application. Next, AI orchestrator program 150 may automatically recommend to a user a highest-scoring applicable AI application. In turn, AI orchestrator program 150 has provided improved methods for learning-based automatic selection of AI applications based upon exam information and type to recommend a highly relevant and high performing AI application to a user for a given exam based upon a generated score reflecting an AI application's performance on a series of relevant test sets.

Figure 2:
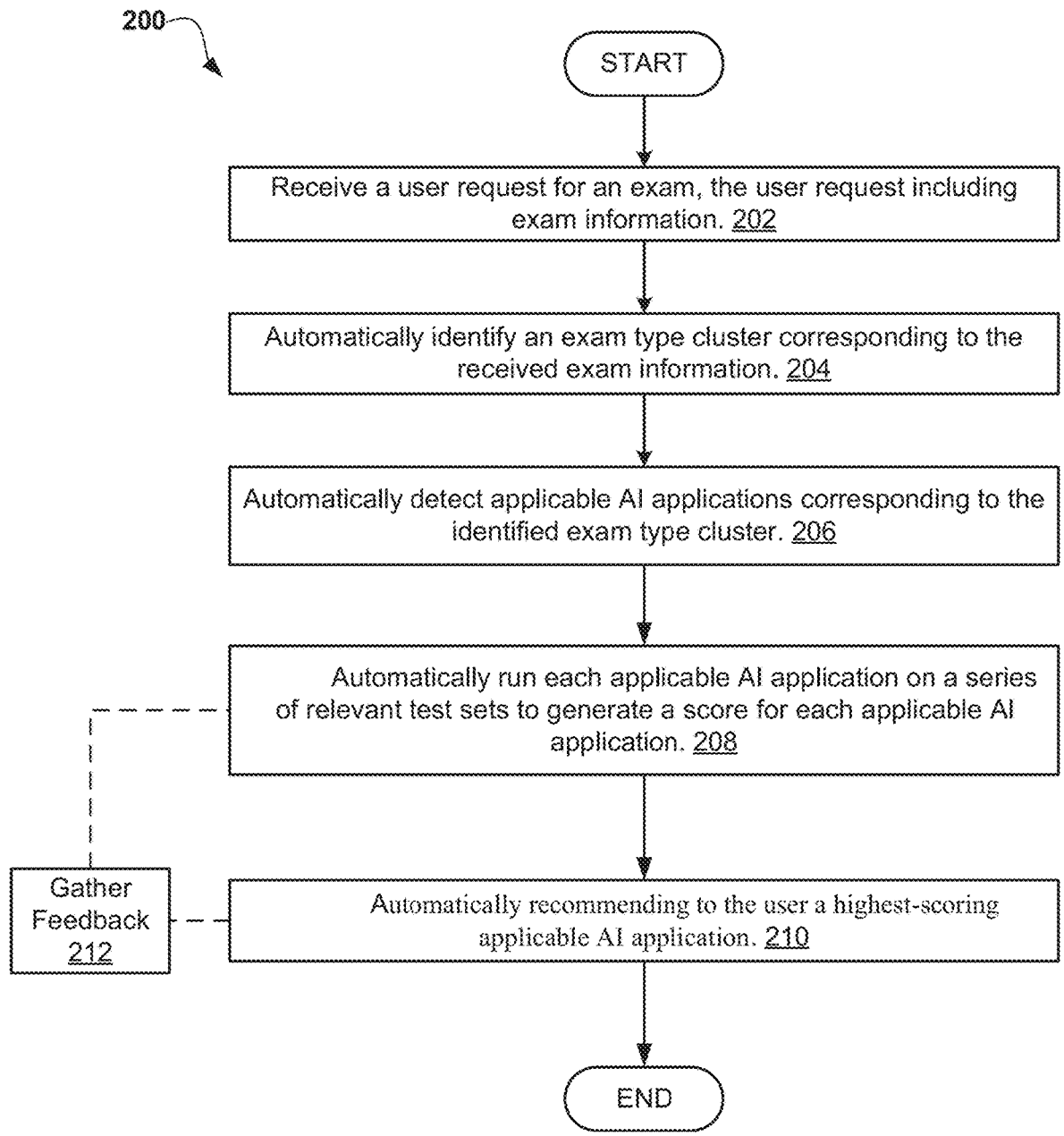
FIG. 2 illustrates an operational flowchart for a process of learning-based automatic selection of AI applications according to at least one embodiment.

Referring now to FIG. 2, an operational flowchart for a process 200 of learning-based automatic selection of AI applications according to at least one embodiment is provided.

At 202, AI orchestrator program 150 may automatically receive a user request for an exam, the user request including exam information. or near field communication. In the context of this disclosure, an exam refers to any type of imaging or medical procedure to be preformed that may be interpreted or enhanced by an applicable AI application. An exam may be derived from any test or procedure that utilizes any known imaging technology, which may include imaging modalities such as those described above in connection with the PACS, including but not limited to: X-ray computed tomography (CT), magnetic resonance imaging (MRI), ultrasound (US), positron emission tomography (PET), endoscopy (ES), mammograms (MG), Digital radiography (DR), computed radiography (CR) and any other suitable imaging modalities. The AI applications of the present disclosure may include any suitable algorithms, programs, or applications that are configured to interpret, enhance, or otherwise process the exam generated using an imaging technology.

When AI orchestrator program 150 receives a request from a user for an exam, there is a variety of exam information that may be contained therein. Exam information may include the imaging procedure or test to be performed, a specific region or part of the body for which the exam is being performed, patient information (both anatomical and demographic in nature), the exam purpose or objective, imaging device information for the imaging device that is to be used, and any other information or data associated with a given exam. For example, AI orchestrator program 150 may receive a request from a user for a CT exam to obtain an image of a patient's chest region for the purpose of identifying potential lung nodules. This exemplary exam request may further include exam information identifying various anatomical or demographical information about the patient, information about the imaging device to be used, and information relating to the patient's specific medical history.

Figure 3:
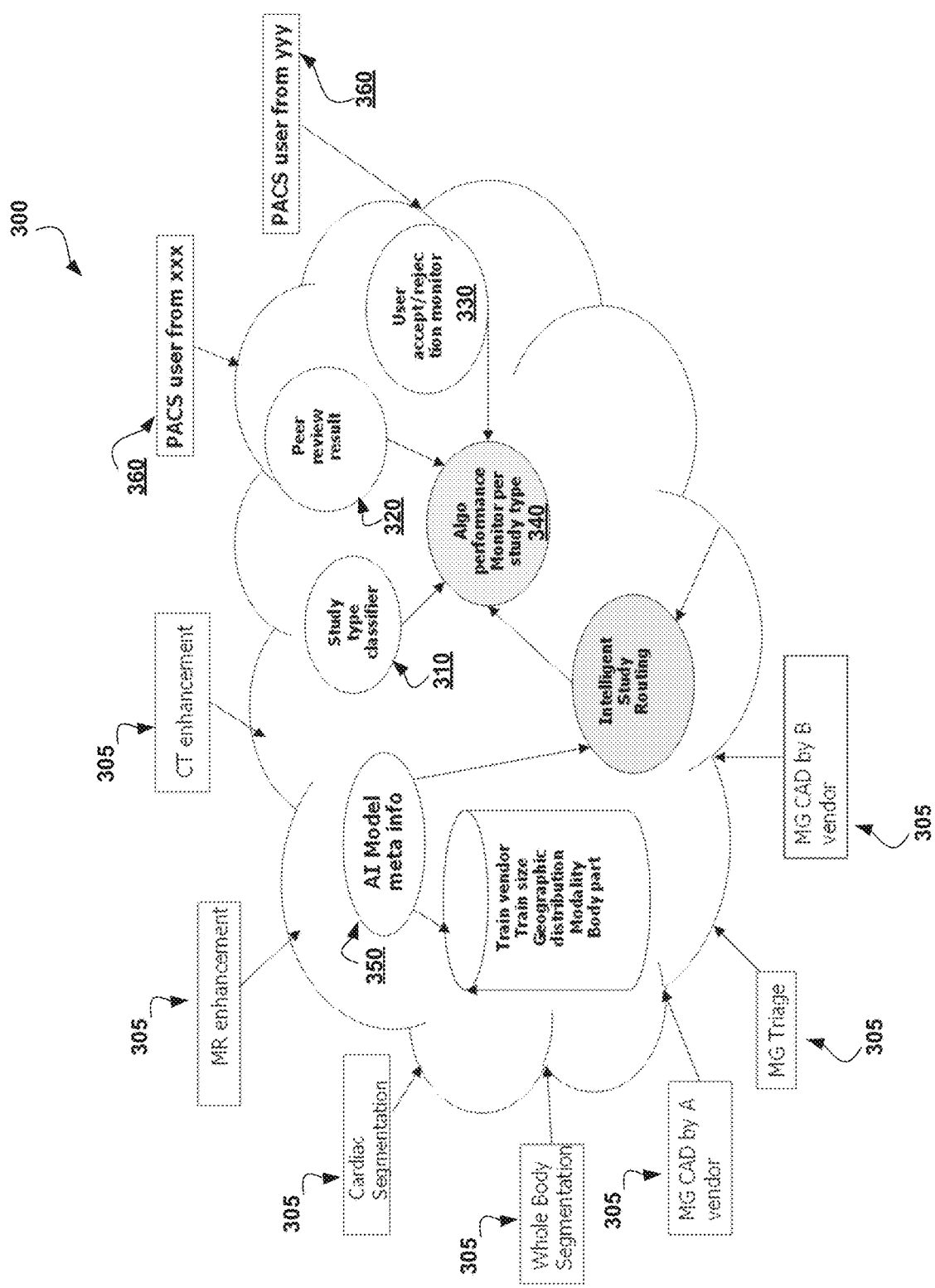
FIG. 3 illustrates a context and flow diagram depicting an exemplary process for intelligent study routing of AI applications for an exemplary system configured to utilize illustrative processes of learning-based automatic selection of AI applications according to at least one embodiment.

At 204, AI orchestrator program 150 automatically identifies an exam type cluster corresponding to the received exam information. This will ultimately allow AI orchestrator program 150 to subsequently determine which other AI applications are applicable for the requested exam based on the identified exam type cluster. In the context of this disclosure 'exam type' refers to a classification automatically derived by AI orchestrator program 150 that is automatically assigned to requested exams sharing a set of characteristics, based upon not only the imaging modality or test to be performed, but also the associated exam information received at 202, including but not limited to patient information (both anatomical and demographic), the exam to be performed, imaging device information, and any other usable exam information received at 202. At 204, AI orchestrator program 150 uses the determined exam type automatically assigned and derived by AI orchestrator program 150 based upon the data and information received at 202 to then identify exam type clusters corresponding to the received user requested exam and corresponding received exam information contained therein. FIG. 3 illustrates a context and flow diagram 300 depicting an exemplary process for intelligent study routing of AI applications for an exemplary system configured to utilize described illustrative processes of learning-based automatic selection of AI applications according to at least one embodiment. For example, AI orchestrator program 150 may utilize a study type classifier 310 that may use any suitable online clustering algorithms to separate input exam information for exemplary exams 305 into sets of exam types. Classifier 310 may automatically learn over time using contrastive learning and generate exam type clusters. The exam type clusters may be further narrowed and split (if statistically significant or appropriate to do so) into additional exam type clusters based upon additional exam information provided, such as anatomical patient information, demographical patient information, and patient history information. In addition to identifying exam type clusters, AI orchestrator program 150 may leverage peer review results 320, and data from a user acceptance/rejection monitor 330 to monitor recommended AI application or algorithm's performances 340 over time for a given exam type. The data obtained from this process in combination with AI model metainformation 350 (vendor, make and model, training data, geographic distribution, body part, applicable functions, etc.) provides AI orchestrator program 150 with data and information to conduct intelligent study routing to ensure the most applicable and effective AI applications are considered for a received exam request as AI orchestrator program 150 gathers more data points and learns more over time. Monitoring AI application performance and associated feedback (including user acceptance/rejection) will be discussed more below in connection with the remaining steps of process 200. AI orchestrator program 150 may be configured to gather data from PACS users 360 across multiple organizations or systems.

At 206, AI orchestrator program 150 automatically detects applicable AI applications corresponding to the identified exam type cluster. For example, if the request discussed above was received for a CT exam to obtain an image of a patient's chest region for the purpose of identifying potential lung nodules, and further included patient information relating to the patient's demographic information, anatomical information, and patient history, AI orchestrator program 150 would automatically use the exam type and information to identify an exam type cluster X corresponding to the received information at 204, and then detect exemplary applicable AI applications Application A, Application B, and Application C that are tagged as being suitable for the identified exam type cluster.

At 208, AI orchestrator program 150 automatically runs each applicable AI application on a series of relevant test sets to generate a score for each applicable AI application. AI orchestrator program 150 may gather and store performance data for each applicable algorithm as they are continuously tested on relevant test sets. The relevant test sets may be previously stored de-identified exams that serve as test exams having AI results stored as ground truths when accepted by a medical practitioner, or user corrections as ground truths where the AI result was deemed to be inaccurate. The relevant test sets may also be automatically generated test sets that are similar to previously stored test sets. Automatic generation of relevant test sets will be further discussed below. The gathered performance data may then be used to generate a score for each applicable AI application. The generated score may be a numerical value that represents the effectiveness or accuracy of a given AI application or algorithm in view of its function or purpose. For example, if an exemplary system includes numerical scores ranging from 0 to 1, where 0 is completely inaccurate and 1 is completely accurate, AI orchestrator program 150 may assign an exemplary AI application X having 90 percent accuracy on the relevant test sets a score of 0.9. This score is a numerical representation of AI application X's ability to accurately make predictions or generate results that are effective or accurate in view of doctor feedback, or an already known ground truth from previously performed exams or previously stored test sets with corresponding stored ground truths generated in view of feedback. AI orchestrator program 150 may continuously generate and update AI application scores as more data is obtained.

At 210, AI orchestrator program 150 automatically recommends to the user a highest-scoring applicable AI application. For example, after receiving an exemplary user request for an exam 'X', AI orchestrator program 150 may identify that exemplary exam 'X' is for a CT of a patient's chest and identify a cluster of applicable AI applications and algorithms including AI Applications A, B, C, and D having scores of 0.7, 0.75, 0.8, and 0.9 respectively. At 210, AI orchestrator program 150 would automatically recommend to the user the highest-scoring applicable AI application for the requested exam, in this case, AI Application D with a score of 0.9. AI orchestrator program 150 may supply AI application D through a connected PACS to the user who made the request.

At 212, AI orchestrator program 150 automatically gathers feedback for the suggest exam. Feedback may be gathered directly from the user in the form of an acceptance of the results generated by the selected AI application recommended at step 210. Feedback may also be gathered from a user rejecting results generated by the selected AI application, and may further include any user corrections to any applicable features for the given exam, such as corrections to contours, measurements, and any other relevant features depending upon the exam performed. In embodiments, the gathered feedback may be stored by AI orchestrator program 150 as a ground truth for a given exam type that may then serve as a test set for other applicable AI applications algorithms in the cluster to further generate additional performance results and update the generated scores for a given AI application or algorithm.

Figure 4:
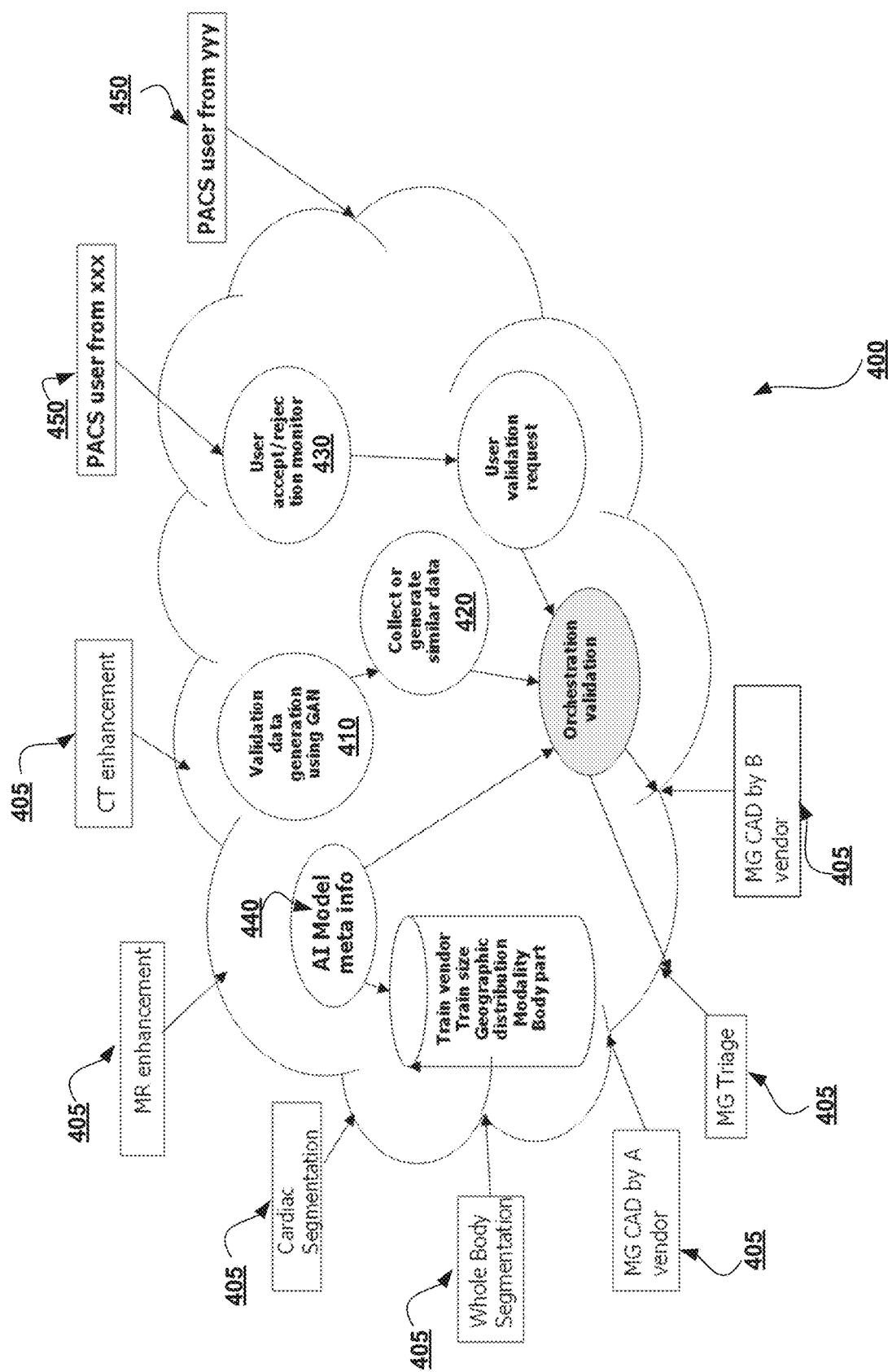
FIG. 4 illustrates a context and flow diagram depicting for an exemplary process for validating AI applications for an exemplary system configured to utilize illustrative processes of learning-based automatic selection of AI applications according to at least one embodiment.

For instances in which a new AI application or algorithm is added, AI orchestrator program 150 may detect that there is an insufficient amount of data to generate a relevant score for the newly added AI application. In embodiments, an insufficient amount of data to generate a relevant score for a newly added AI application may be configured to be any detected amount of data or any number of sample datasets that is below a preconfigured threshold value or number. Accordingly, in response to detecting an amount of data for generating a relevant score for a newly added AI application that is below a threshold value or number, AI orchestrator program 150 may subsequently employ an initialization process to gather additional data. In an exemplary initialization process for a newly added AI application, data gathered using the stored test sets at 212 may be used to validate the new AI application or algorithm. In embodiments, test sets or simulated exam types may be automatically generated. FIG. 4 illustrates a context and flow diagram depicting for an exemplary process for validating AI applications for an exemplary system configured to utilize illustrative processes of learning-based automatic selection of AI applications according to at least one embodiment. As shown in FIG. 4, in some embodiments, validation data may be gathered or generated for exemplary exam types 405 using general adversarial networks (GAN) to generate similar examples (See 410 and 420 in FIG. 4) to previously stored datasets and running a new applicable AI application on the generated examples. The ground truths for the originally stored examples at 212 would allow for accurate determinations of AI application performance on the corresponding simulated exams. A user acceptance/rejection monitor 430 and AI model meta information 440 (as discussed above in connection with FIG. 3) may also be used for facilitating orchestration validation of newer AI applications or algorithms. AI orchestrator program 150 may be configured to gather data from PACS users 450 across multiple organizations or systems. In embodiments, AI orchestrator program 150 may further include tools for ensuring that AI applications from different vendors are compatible with stored exams, stored data, and stored ground truths generated using AI applications from different vendors. For example, if a specific type of mammogram exam is incompatible with Vendor A's AI application, AI orchestrator program 150 may include tools to make Vendor A's AI application compatible with the exam.

It will be appreciated that AI orchestrator program 150 utilizes machine learning to improve its ability to consistently classify exams based on a variety of exam information inputs, as well as to improve its ability to continuously monitor and determine AI application performance across a variety of exam types based on determinations of AI application performance over multiple stored test sets and simulated or generated test sets. In turn, AI orchestrator program 150 provides for improved automatic selection of AI applications to the benefit of businesses who utilize AI orchestrator systems and PACS, medical practitioners who use AI applications in their course of work, and patients who would benefit from improved AI application selection.

In the context of this disclosure, machine learning broadly describes a function of a system that learns from data. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule.

In embodiments, AI orchestrator program 150 may leverage machine learning to use the gathered performance data and generated scores to determine specific tasks or functions that a given AI application is optimal for performing for a given exam type. Accordingly, in embodiments, AI orchestrator program 150 may be configured to recommend an AI application solution for a requested exam that takes advantage of a first function or operation performed by a first AI application or algorithm, and further recommend a second AI application solution that takes advantage of a second function or operation. In other words, AI orchestrator program 150 may identify one or more objectives of the requested exam and identify the highest-scoring applications for each of the one or more objectives of the requested exam. For example, for an exemplary exam type related to imaging exams to detect prostate abnormalities, AI orchestrator program 150 may identify a first objective for the requested exam related to prostate segmentation and a second objective related to obtaining a lesion heatmap. AI orchestrator program 150 may then consider recommending exemplary applicable AI applications A and B respectively. AI application A may provide prostate segmentation as well as lesion segmentation, while AI application B may provide prostate segmentation as well as a lesion heatmap. AI orchestrator program 150 may automatically select and return to the user, based on the exam information in the request, the prostate segmentation results from Application A (if the prostate segmentation function was scored higher in Application A than it was scored in Application B), and lesion heatmap results from application B. Even though Application B included both functions, Application A was still used for the prostate segmentation function or objective because Application A performed better for that function. This functionality is especially useful for instances in which an exam request includes functions that are not contained in a singular AI application, or instances in which one AI application excels at one requested function, and another AI application excels at a different requested function.

AI orchestra program 150 may be further be configured to leverage machine learning to interpret acceptance or rejection data for specific AI applications to make determinations regarding generating or processing of various fees or charges for the requesting user or medical practitioner as is desired or appropriate for a given environment in which the system is deployed. In some instances, AI orchestrator program 150 may be configured, for example, to generate no fee or charges in instances in which an AI application's results are rejected.

It may be appreciated that FIGS. 2-3 provide only illustrations of an exemplary implementation and do not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method for learning-based automatic selection of artificial intelligence (AI) applications, the method comprising:
    receiving a user request for an exam, the user request including exam information;
    automatically identifying an exam type cluster corresponding to the received exam information;
    automatically detecting applicable AI applications corresponding to the identified exam type cluster;
    automatically running each applicable AI application on a series of relevant test sets to generate a score for each applicable AI application, wherein the series of relevant test sets comprise previously stored exams, each of the previously stored exams including a respective stored ground truth; and
    automatically recommending to a user a highest-scoring applicable AI application based on the generated scores.

2. The computer-based method of claim 1, further comprising:
    automatically storing obtained results generated by each of the applicable AI applications; and
    receiving corresponding feedback on the obtained results for the highest-scoring AI application.

3. The computer-based method of claim 2, further comprising:
    in response to detecting that the corresponding received feedback includes acceptance of the obtained results for the highest-scoring AI application, automatically storing the obtained results for the highest-scoring AI application as a ground truth; and
    in response to detecting that the corresponding received feedback includes user corrections to the obtained results for the highest-scoring AI application, automatically storing the corrections as the ground truth.

4. The computer-based method of claim 1, further comprising:
    automatically identifying one or more objectives of the requested exam and identifying the highest-scoring AI applications for each of the one or more objectives of the requested exam.

5. The computer-based method of claim 4, further comprising:
    automatically outputting to the user a series of combined results corresponding the highest-scoring AI applications for each of the identified one or more objectives of the requested exam.

6. The computer-based method of claim 1, further comprising:
    automatically using a trained classifier to separate subsequently received exams and corresponding exam information using contrastive learning to generate exam type clusters.

7. The computer-based method of claim 1, further comprising:
    in response to detecting a newly added AI application having an amount of data for generating a score that is below a predetermined threshold value, automatically employing an initialization process, wherein the initialization process comprises gathering performance data for the newly added AI application using previously stored or automatically generated test data sets.

8. A computer system, the computer system comprising:
    one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
    receiving a user request for an exam, the user request including exam information;
    automatically identifying an exam type cluster corresponding to the received exam information;
    automatically detecting applicable AI applications corresponding to the identified exam type cluster;
    automatically running each applicable AI application on a series of relevant test sets to generate a score for each applicable AI application, wherein the series of relevant test sets comprise previously stored exams, each of the previously stored exams including a respective stored ground truth; and
    automatically recommending to a user a highest-scoring applicable AI application based on the generated scores.

9. The computer system of claim 8, further comprising:
automatically storing obtained results generated by each of the applicable AI applications; and
receiving corresponding feedback on the obtained results for the highest-scoring AI application.

10. The computer system of claim 9, further comprising:
in response to detecting that the corresponding received feedback includes acceptance of the obtained results for the highest-scoring AI application, automatically storing the obtained results for the highest-scoring AI application as a ground truth; and
in response to detecting that the corresponding received feedback includes user corrections to the obtained results for the highest-scoring AI application, automatically storing the corrections as the ground truth.

11. The computer system of claim 8, further comprising:
automatically using a trained classifier to separate subsequently received exams and corresponding exam information using contrastive learning to generate exam type clusters.

12. The computer system of claim 8, further comprising:
in response to detecting a newly added AI application having an amount of data for generating a score that is below a predetermined threshold value, automatically employing an initialization process, wherein the initialization process comprises gathering performance data for the newly added AI application using previously stored or automatically generated test data sets.

13. The computer system of claim 8, further comprising:
automatically identifying one or more objectives of the requested exam and identifying the highest-scoring AI applications for each of the one or more objectives of the requested exam.

14. The computer system of claim 8, further comprising:
automatically outputting to the user a series of combined results corresponding the highest-scoring AI applications for each of the identified one or more objectives of the requested exam.

15. A computer program product, the computer program product comprising:
one or more computer-readable tangible storage medium and program instructions stored on at least one of the one or more computer-readable tangible storage medium, the program instructions executable by a processor capable of performing a method, the method comprising:
receiving a user request for an exam, the user request including exam information;
automatically identifying an exam type cluster corresponding to the received exam information;
automatically detecting applicable AI applications corresponding to the identified exam type cluster;
automatically running each applicable AI application on a series of relevant test sets to generate a score for each applicable AI application, wherein the series of relevant test sets comprise previously stored exams, each of the previously stored exams including a respective stored ground truth; and
automatically recommending to a user a highest-scoring applicable AI application based on the generated scores.

16. The computer program product of claim 15, further comprising:
automatically storing obtained results generated by each of the applicable AI applications; and
receiving corresponding feedback on the obtained results for the highest-scoring AI application.

17. The computer program product of claim 16, further comprising:
in response to detecting that the corresponding received feedback includes acceptance of the obtained results for the highest-scoring AI application, automatically storing the obtained results for the highest-scoring AI application as a ground truth; and
in response to detecting that the corresponding received feedback includes user corrections to the obtained results for the highest-scoring AI application, automatically storing the corrections as the ground truth.

18. The computer program product of claim 15, further comprising:
automatically using a trained classifier to separate subsequently received exams and corresponding exam information using contrastive learning to generate exam type clusters.

19. The computer program product of claim 15, further comprising:
in response to detecting a newly added AI application having an amount of data for generating a score that is below a predetermined threshold value, automatically employing an initialization process, wherein the initialization process comprises gathering performance data for the newly added AI application using previously stored or automatically generated test data sets.

20. The computer program product of claim 15, further comprising:
automatically identifying one or more objectives of the requested exam and identifying the highest-scoring AI applications for each of the one or more objectives of the requested exam.

* * * * *